(12) United States Patent
Jackson et al.

(10) Patent No.: US 6,237,234 B1
(45) Date of Patent: May 29, 2001

(54) METHOD AND APPARATUS FOR MEASURING VEHICLE WHEEL ROLL RADIUS

(75) Inventors: David A. Jackson, Los Gatos; Hoshang Shroff, Cupertino; Stephen L. Glickman, Los Gatos, all of CA (US)

(73) Assignee: Snap-On Technologies, Inc., Lincolnshire, IL (US)

( * ) Notice: Subject to any disclaimer, the term of this patent is extended or adjusted under 35 U.S.C. 154(b) by 0 days.

(21) Appl. No.: 09/407,018

(22) Filed: Sep. 28, 1999

(51) Int. Cl.[7] .............................. G01B 3/12; G01B 11/08
(52) U.S. Cl. ............................. 33/203; 33/288; 33/555.1
(58) Field of Search ....................... 33/203, 288, 203.12, 33/203.13, 203.14, 203.15, 203.18, 600, 555.1

(56) References Cited

U.S. PATENT DOCUMENTS

| | | | |
|---|---|---|---|
| 2,435,644 | * 2/1948 | Beckett et al. | 33/203.12 |
| 2,650,437 | * 9/1953 | Glynn | 33/203 |
| 3,633,279 | * 1/1972 | Frazier et al. | 33/203.12 |
| 5,452,606 | * 9/1995 | Castelnuovo | 33/203 |
| 5,535,522 | 7/1996 | Jackson | 33/288 |
| 5,791,059 | * 8/1998 | Vaccaro et al. | 33/555.1 |
| 5,809,658 | 9/1998 | Jackson et al. | 33/288 |

* cited by examiner

Primary Examiner—Christopher W. Fulton
(74) Attorney, Agent, or Firm—McDermott, Will & Emery

(57) ABSTRACT

A method and apparatus are provided for determining a roll radius of a vehicle wheel for use in alignment and other diagnostic or maintenance operations. An optically scannable target is attached to a wheel of the vehicle. A first position measurement is made using a machine vision system, such as a three-dimensional aligner. The vehicle is rolled a short distance and a second position measurement is made. The linear and angular differences of the first and second position measurements are used to compute and store a roll radius value. Alignment values resulting from alignment of the motor vehicle are modified based on the roll radius value. A plane angle value may also be created and stored for use in adjusting the alignment values.

45 Claims, 10 Drawing Sheets

Distance Traveled 808

Angle of Rotation 910

METHOD AND APPARATUS FOR MEASURING VEHICLE WHEEL ROLL RADIUS

FIELD OF THE INVENTION

The present invention generally relates to motor vehicle maintenance equipment and methods, and it relates more specifically to apparatus and methods that provide measurements of the roll radius of motor vehicle wheels and related measurements.

BACKGROUND OF THE INVENTION

Motor vehicle wheel alignment systems are important for ensuring that the alignments of wheels are within the specifications provided by motor vehicle manufacturers. If wheels are out of alignment, there may be excessive or uneven tire wear. In addition, the performance of the vehicle, particularly handling and stability, may be adversely affected if the wheels are not properly aligned. As used herein, "wheel" refers to the tire and wheel assembly found on a motor vehicle. Such an assembly is generally comprised of a conventional tire that is mounted on a metal wheel or "rim."

The wheels of a motor vehicle may be aligned in a number of ways. For example, an operator or an alignment technician can use a vision imaging apparatus such as a machine vision system that employs optical sensing devices, such as cameras, to determine the positions of various objects. An example of such machine vision systems is the apparatus and method described in U.S. Pat. No. 5,809,658, entitled "Method and Apparatus For Calibrating Cameras Used in the Alignment of Motor Vehicle Wheels," U.S. Pat. No. 5,724,743, entitled "Method and Apparatus for Determining the Alignment of Motor Vehicle Wheels," and U.S. Pat. No. 5,535,522, entitled "Method and Apparatus for Determining the Alignment of Motor Vehicle Wheels." The apparatus described in these references is sometimes called a "3D aligner" or simply an "aligner." FIG. 1 provides a top view schematic of such an aligner. The aligner of FIG. 1 is discussed in more detail below.

The alignment of wheels of a motor vehicle may be affected by changes in the size of the wheels. Even small changes in the size of the wheels can cause large changes in the alignment. As a result, most automotive manufacturers recommend that the alignment technician inspect all wheels to ensure that they are matched (e.g., that they are all the same size), that the tires on the wheels are not worn, and that each tire is properly inflated. If any of these problems exist, the alignment technician should correct them before continuing with the alignment. Unfortunately, the alignment technician may forget to perform such inspections and repairs, or the alignment technician may have difficulty assessing the condition of the tires. In either case, the alignment may be adversely affected, potentially resulting in degraded performance of the vehicle.

In addition, the alignment specifications provided by the automotive manufacturers are referenced to the plane that the vehicle is sitting on, also known as the "gravity plane" or the "rack plane." However, in some alignment systems, such as the aligner noted above, the alignment measurements that are taken are referenced to the plane passing through the center of the wheels, also known as the "vehicle plane." For vehicles with the same size wheels, the rack plane and vehicle plane are parallel. But if the wheels have different sizes, the rack plane and the vehicle plane are not parallel. As a result, the manufacturer specifications cannot be compared directly to the alignment measurements taken by the aligner.

The alignment technician must also have relevant information readily available to properly perform the alignment. Such information may include: the size of the wheels; the relative size of the wheels in comparison to one another; the automotive manufacturer specifications; the measured wheel alignments; and the results of adjusting either the measured wheel alignments or the manufacturer specifications for the angle between the rack plane and the vehicle plane when using alignment systems such as the aligner noted above.

Based on the foregoing, there is a clear need in this field for an apparatus and method that provides measurements indicating the size of the wheels of a motor vehicle.

There is also a need for an apparatus and method that determines if there are differences between the sizes of the wheels of a given motor vehicle.

There is also a need for an apparatus and method that displays the results of wheel measurements to aid an alignment technician with the following tasks: detecting wheels with low air pressure; determining if some wheels have more wear than others; identifying if the wheels on a vehicle are mismatched; or indicating that there is unequal suspension loading.

There is also a need for an apparatus and method that measure the angle between the rack plane and the vehicle plane so that a technician may determine if these planes are parallel.

There is also a need for an apparatus and method that can adjust the measured alignments to achieve correct alignment if the rack plane and the vehicle plane are not parallel.

It would be advantageous to have an apparatus and method that, as part of the alignment process, automatically determines and displays important information, such as the following: the sizes of the wheels; comparisons among the wheels of a motor vehicle; the alignment specifications of the automotive manufacturer; the measured alignments; and the results of adjusting either the measured wheel alignments for the angle between the rack plane and the vehicle plane.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Apparatus and methods for the measurement of a vehicle wheel roll radius and of the angle between the rack plane and the vehicle plane are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

BACKGROUND AND FOUNDATION CONCEPTS

Definition of Roll Radius

Figure 2:
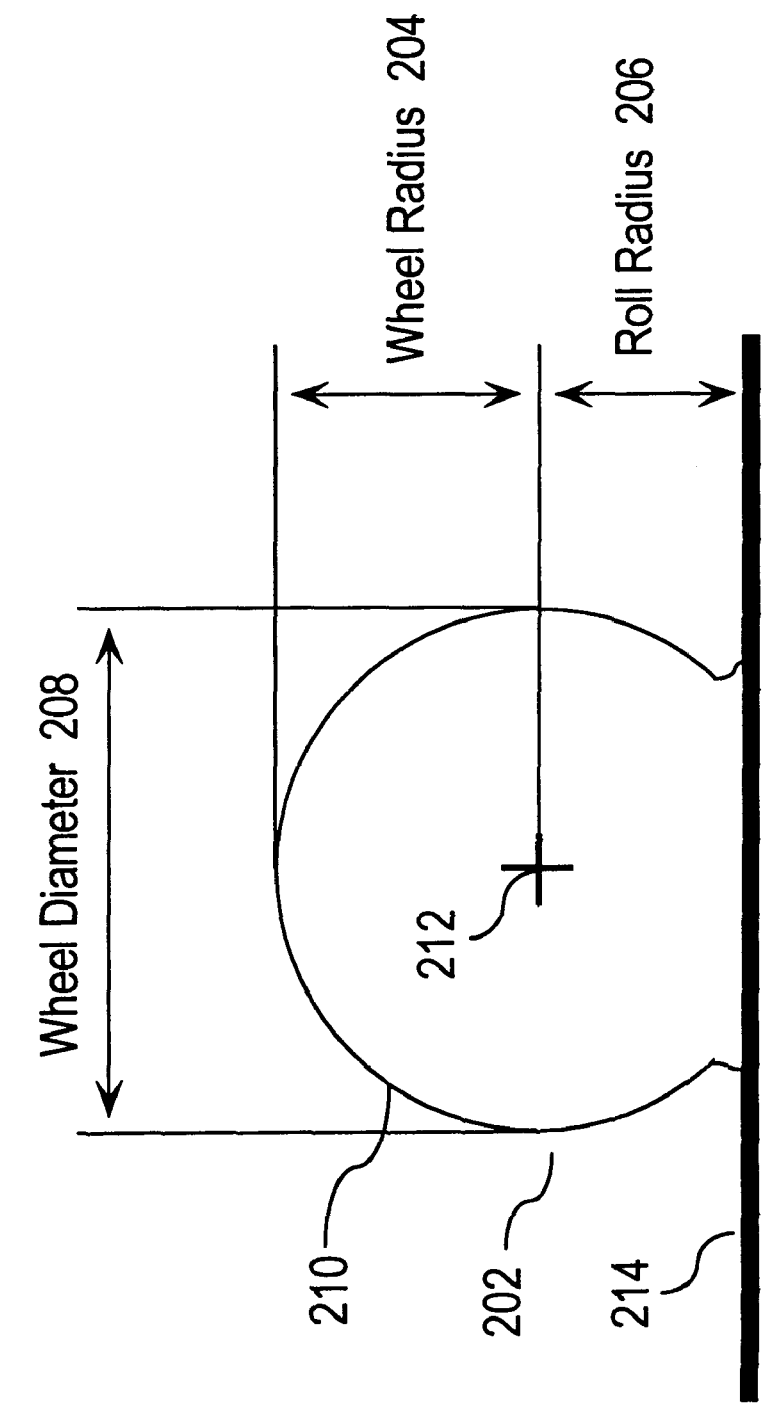
FIG. 2 is a diagram of a wheel illustrating wheel radius and roll radius.

FIG. 2 is a diagram of a vehicle wheel 202 that has a wheel radius 204 and roll radius 206. Wheel 202 generally has a constant wheel diameter 208 and is depicted in FIG. 2 at rest on a surface 214. The radius of the wheel 202 is defined as distance between a wheel center 212 and a wheel surface 210. The radius varies depending on which point on the wheel surface 210 is selected for the measurement. For example, if the radius is measured from wheel center 212 to the top surface of wheel 202, the result is wheel radius 204, which is equal to half of the wheel diameter 208. However, due to the weight of the vehicle, the tire deflects and flattens out against the surface 214 that wheel 202 either sits on or rolls on. Also, if the air pressure of the tire of wheel 202 is below the manufacturer specifications, the wheel 202 has a strong tendency to flatten out against surface 214 forming a large flat spot or contact area. Therefore, a measurement of the radius of wheel 202 from wheel center 212 to the bottom surface of the wheel 202, which is in contact with surface 214, yields a roll radius 206 that is less than wheel radius 204.

The difference between roll radius 206 and wheel radius 204 may adversely affect the alignment being done on the vehicle, thereby impacting the performance of the vehicle. Also, a comparison of the roll radius measurements of the wheels of a vehicle may provide the alignment technician with indications of wheel mismatch, uneven wear, low tire pressure, or unequal suspension loading.

Determining the Roll Radius

Because roll radius 206 is less than wheel radius 204, the distance traveled over the surface 214 as wheel 220 rotates is more for a given distance than if wheel 220 is properly inflated. Wheel 220 acts as if it is a smaller circular wheel having a radius equal to roll radius 206. Roll radius 206 may be measured by rolling wheel 220 a short distance. Specifically, by determining the distance that the wheel has rolled and the angle through which the wheel has turned, roll radius 206 may be determined.

Figure 3A:
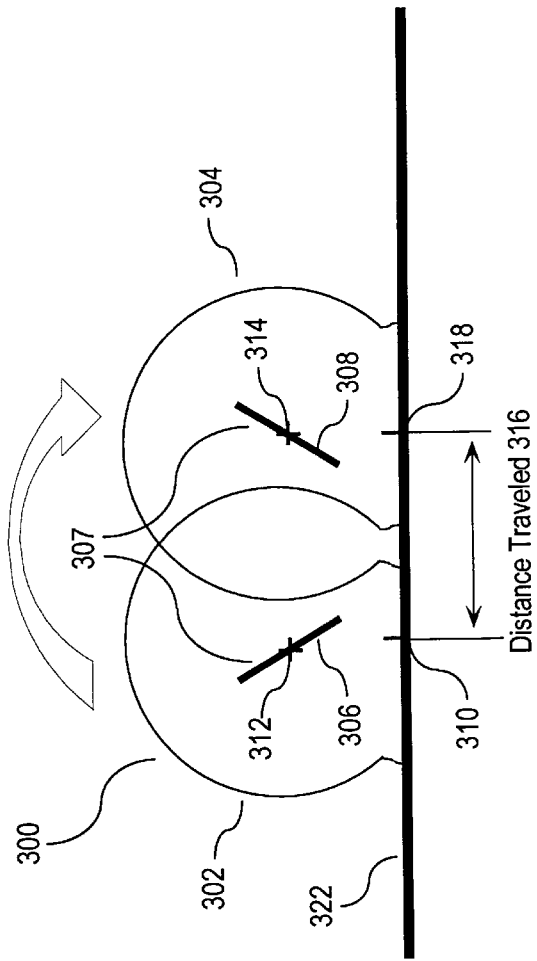
FIG. 3A is a diagram of the distance traveled by a wheel as it is rolled.

FIG. 3A is a diagram of the change in position of a vehicle wheel 300 as it is rolled a short distance from an initial position 302 on the left to a final position 304 on the right. The following description also applies to rolling a wheel from right to left.

Initial position 302 is characterized by an initial contact point 310 that is between the surface of the vehicle wheel 300 at initial position 302 and a surface 322 upon which the wheel 300 sits or rolls. Initial contact point 310 is directly below an initial position 312 of the wheel center. A target 307 may be attached to the wheel. Target 307 has initial orientation 306. Target 307 is a square element that is optically scannable or detectable by a machine vision system or equivalent apparatus.

In the example shown in FIG. 3A, final position 304 is characterized by a final contact point 318 that is between the surface of the wheel at the final position 304 and surface 322. Final contact point 318 is directly below a final position 314 of the wheel center. Target 307 has final orientation 308.

Comparison of initial contact point 310 and final contact point 318 yields a measurement of a "distance traveled" 316 by wheel 300 as it is rolled. The distance traveled 316 is sometimes also referred to as the "distance traversed" or the "traversed distance." A typical distance traveled may be 6 inches to 3 feet.

Figure 3B:
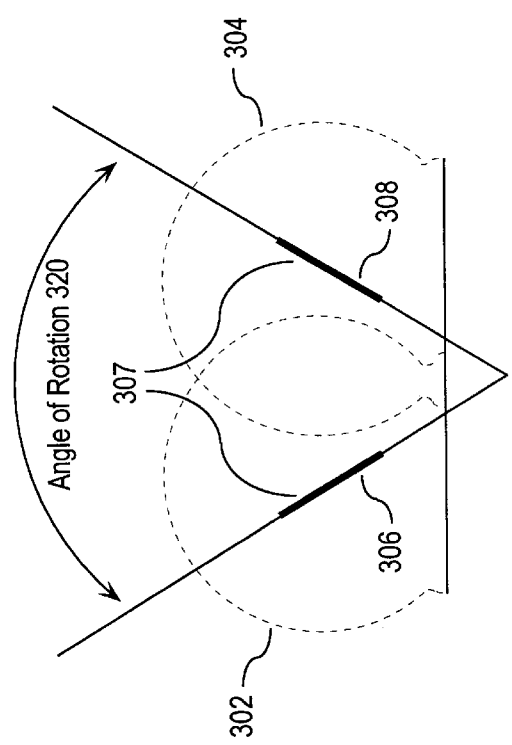
FIG. 3B is a diagram of the angle of rotation of a wheel as it is rolled.

FIG. 3B is a diagram of an angle of rotation 320 through which a vehicle wheel rolls in moving from initial position 302 to final position 304. Comparison of initial orientation 306 of target 307 to final orientation 308 yields a measurement of the angle of rotation 320. The angle of rotation 320 is sometimes also referred to as the "angle of roll" or the "roll angle." An automatic machine vision system, under control of appropriate software, may be used to obtain position information for target 307, as described further below.

By using values representing the distance traveled 316 and the angle of rotation 320, the roll radius of the wheel may be measured.

The circumference of a circle is determined by the relationship:

$$C = 2\pi R \tag{1}$$

where C is the circumference of a circle, R is the circle's radius, and $\pi$ is the geometric constant pi.

If a circle is rotated through a given angle, the ratio of that angle in degrees, $\vartheta$, to a full rotation of 360 degrees is the same as the ratio of the partial circumference, P, that the circle roll to the circle's full circumference, C. This relationship may be stated as follows:

$$\frac{\vartheta}{360} = \frac{P}{C} \tag{2}$$

Solving this expression for the circumference, C, yields:

$$C = \frac{360(P)}{\vartheta} \tag{3}$$

To find the circle's radius, R, the expression for the circumference, C, from Equation 3 is substituted into Equation 1 and solved for R. This yields the following relationship for the circle's radius:

$$R = \frac{360(P)}{2\pi\vartheta} \tag{4}$$

A similar expression may be written with other units for the angle of rotation. For example, if the angle of rotation were measured in radians, the constant "360" in Equation 4 would be replaced by "$2\pi$."

Applying this relationship to a wheel that is rolled as illustrated in FIG. 3A, the partial circumference, P, is the distance traveled 316. The angle, $\vartheta$, is the angle of rotation 320. The radius, R, is roll radius 206 as shown in FIG. 2.

Therefore, given the distance traveled 316 and the angle of rotation 320, roll radius 206 of wheel 202 may be measured. Values for the distance traveled 316 and the angle of rotation 320 may be determined using a wheel alignment system, such as described further herein.

Figure 1:
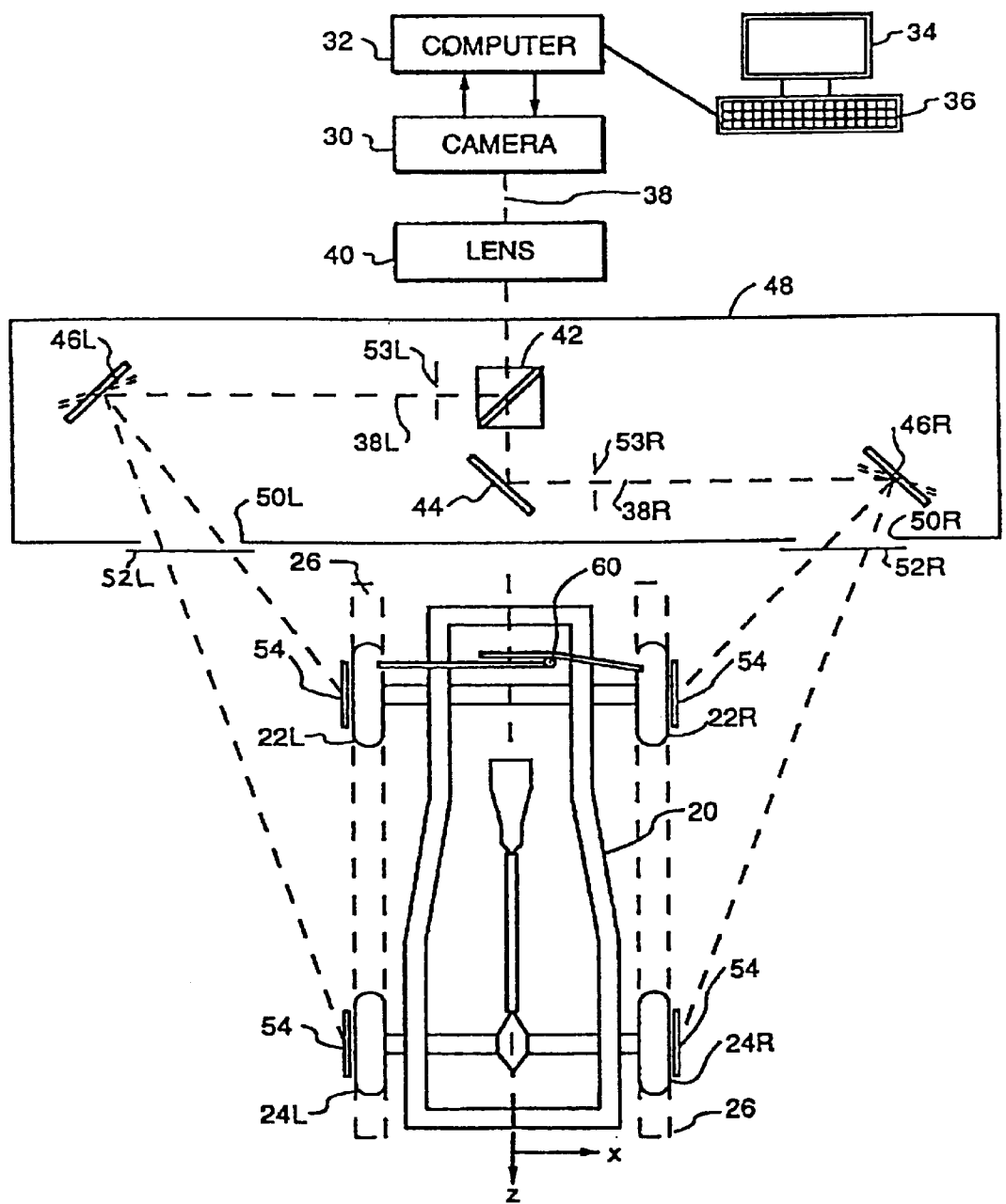
FIG. 1 is a schematic representation of an exemplary vehicle wheel alignment system that uses a single camera.

Overview of Computer-Aided Three-Dimensional Motor Vehicle Wheel Alignment System FIG. 1 is a schematic representation of a computer-aided, three-dimensional (3D) motor vehicle wheel alignment system ("3D aligner" or "aligner"). While FIG. 1 depicts a single camera alignment system, other machine vision systems may be used, including those that have more than one camera.

In FIG. 1, a vehicle 20 is represented by a schematic illustration of a chassis of the vehicle and includes two front wheels 22L and 22R and two rear wheels 24L and 24R. The vehicle 20 is positioned on a conventional wheel alignment test bed or alignment rack 26, indicated by broken lines. Targets 54 are mounted on each wheel.

A video camera 30 is coupled to an electronic processing means such as a computer 32, data processor, or other equivalent device, that can be programmed to process information. Computer 32 can also display results such as on a visual display unit 34. An input device such as a keyboard 36 may be used for inputting data and other relevant information into computer 32. A computer-generated quasi-three-dimensional (3D) representation of the wheels being aligned may be depicted on display unit 34 along with indicia of the detected alignment. In addition, display unit 34 may depict hints or suggestions to guide the alignment technician who is performing the wheel alignment. Computer 32, display unit 34, and keyboard 36 represent a simplified representation of the type of computer hardware upon with this embodiment may be implemented. Other variations of the hardware that may be used in this and other embodiments are discussed below.

The video camera 30 sights onto the wheels 22L, 22R, 24L and 24R along a view path 38 that passes through a lens 40 and onto a beam splitter 42. Beam splitter 42 splits view path 38 into two components, 38L and 38R, respectively. As shown in FIG. 1, the left hand component 38L of view path 38 is reflected perpendicularly to the initial view path by beam splitter 42. Similarly, right hand component 38R is reflected perpendicularly to the initial view path by a prism or mirror 44 mounted adjacent to beam splitter 42. The apparatus also includes a housing 48R into which beam splitter 42, mirror 44, and at least two pan-and-tilt mirrors, 46L and 46R, are mounted. From this point onward the respective components of the apparatus and the view path are identical for both the left and right side of the motor vehicle, and therefore a description of only one side will suffice.

Targets 54, which are optically scannable, are attached to each of the wheels 22L and 24L. Left-hand component 38L of view path 38L is reflected onto targets 54 by left side pan-and-tilt mirror 46L. Left side pan-and-tilt mirror 46L is movable to allow video camera 30 to consecutively view front wheel 22L and rear wheel 24L of vehicle 20. Alternatively left side pan-and-tilt mirror 46L may be configured to view both front and rear wheels 22L and 24L simultaneously.

In this embodiment of a single camera alignment system, view path 38L passes from pan-and-tilt mirror 46L through an aperture 50L in the wall of housing 48L and onto the respective wheels 22L and 24L. A shutter 52L is positioned so that it may be operated to close aperture 50L thereby effectively blocking view path 38L and allowing video camera 30 to sight onto the right hand side of vehicle 20 only. Alternatively, shutters may be placed at locations 53L and 53R and/or an electronic shutter within video camera 30 may be synchronized with one or more strobed light sources to permit capture of an image only when a particular target or targets are illuminated.

In a typical operation, the apparatus of this embodiment of a wheel alignment system works generally as follows: vehicle 20 is positioned on alignment rack 26, which is raised to allow the alignment technician to perform the alignment. Targets 54 are mounted onto each of wheels 22L, 22R, 24L, and 24R. The alignment apparatus forms a detected image of each target 54. These detected images are processed in computer 32, which calculates the orientation of each of the targets to the respective view paths 38L and 38R. Computer 32 may also store values corresponding to the position of each detected image.

Typically, the spindle position is also located. In this operation, the Computer 32 acquires images of the targets. The vehicle is rolled back, and the computer acquires a second set of images of the targets. The computer computes the angle through which the vehicle was rolled back, and based on such calculation, determines the spindle location. Optically, the vehicle can be rolled forward and remeasured as a check.

Furthermore, Computer 32 makes the necessary corrections to calculate the true orientation of the wheels relative to the respective view paths and to allow for the orientation of pan-and-tilt mirrors 46L and 46R. Computer 32 may then calculate the actual orientation of the primary planes of each of wheels 22L, 22R, 24L, and 24R. A "primary plane" is an imaginary plane with a generally vertical orientation that is parallel to the tread of the tire that is part of the wheel.

The results of the computations described above are displayed on display unit 34. Computer 32 may also have display unit 34 show instructions to the alignment technician as to what corrections may need to be made to correct any detected misalignment of wheels 22L, 22R, 24L, and 24R of vehicle 20.

Aligner Measurements of Distance Traveled amd Angle of Rotation

In the preferred embodiment, an alignment system of the type shown in FIG. 1 is used to measure the distance traveled 316 and the angle of rotation 320 of each wheel 22L, 22R, 24L, and 24R as vehicle 20 is rolled from initial position 302 to final position 304.

Vehicle 20 is initially positioned on alignment rack 26 and targets 54 are attached to each wheel 22L, 22R, 24L, and 24R. The aligner takes images of each target 54 to determine an initial position 302 of each of the wheels 22L, 22R, 24L, and 24R. Computer 32 creates and stores values corresponding to the initial position 302 of each of the wheels 22L, 22R, 24L, and 24R.

Vehicle 20 is rolled from initial position 302 to final position 304. Once vehicle 20 has been rolled, the aligner takes images of each target 54 to determine a final position 304 of each of the wheels 22L, 22R, 24L, and 24R. Computer 32 creates and stores values corresponding to the final position 304 of each of the wheels 22L, 22R, 24L, and 24R. The aligner may also prompt a technician to roll the vehicle and take position measurements by appropriate instructions or signals generated by computer 32.

The aligner processes the images of initial position 302 and final position 304 of each wheel 22L, 22R, 24L, and 24R to determine both the distance traveled 316 and the angle of rotation 320 of each wheel 22L, 22R, 24L, and 24R. Under control of software or electronics, values for the distance traveled 316 and the angle of rotation 320 are created and stored. Based on these two measurements, the aligner calculates the roll radius 206 of each wheel 22L, 22R, 24L, and 24R according to Equation 4 above. A roll radius value is created and stored. The aligner then presents resulting values on display unit 34 for evaluation. The alignment technician can then use such results to help diagnose the condition of the vehicle and the wheels, including whether the wheels are properly matched, if there is excessive wear on any of the wheels, whether the wheels are properly inflated, and if there is unequal suspension loading.

In moving vehicle 20 from initial position 302 to final position 304, vehicle 20 is rolled a sufficient distance to provide for accurate measurements of the distance traveled 316 and the angle of rotation 320 of each of wheels 22L, 22R, 24L, and 24R. However, there are limits on how far vehicle 20 may be moved due to practical considerations such as keeping the vehicle on alignment rack 26. For this embodiment, the minimum angle of rotation 320 through which vehicle 20 must be rolled is about 10 degrees. Furthermore, moving the vehicle such that the angle of rotation 320 is about 30 degrees provides accurate measurements while keeping vehicle 20 on alignment rack 26.

Figure 4:
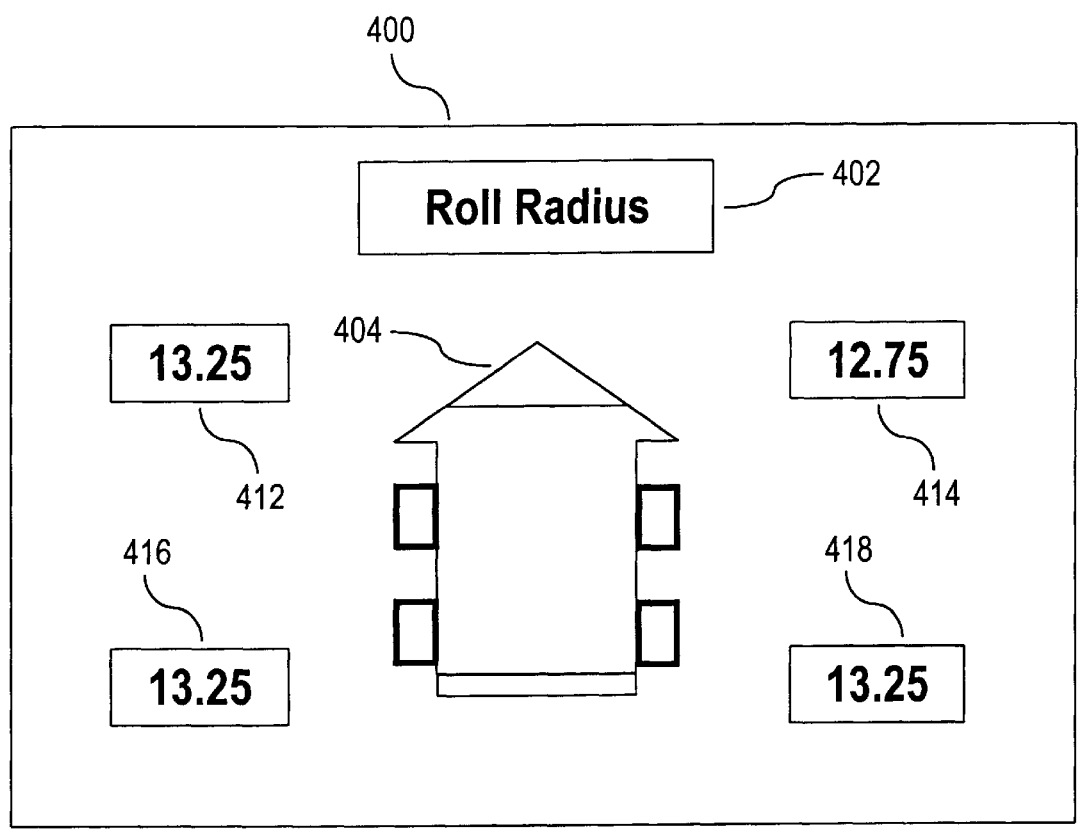
FIG. 4 is a diagram of an exemplary display of roll radius measurements for a wheel.

FIG. 4 is a diagram of an exemplary display 400 that may be shown on display unit 34, which shows values for the roll radius 206 for each wheel 22L, 22R, 24L, and 24R of vehicle 20. Display 400 has a title 402 that indicates that the data displayed is the roll radius 206 of each wheel 22L, 22R, 24L, and 24R. For example, roll radius 206 of wheel 22L is shown in display element 412. Likewise, the roll radius 206 of wheels 22R, 24L, and 24R are shown in display elements 414, 416, and 418, respectively. A motor vehicle graphic 404 is provided to aid the alignment technician in correlating the measurements of the display elements to the corresponding wheels.

In addition, the aligner can perform comparisons of the resulting values for each wheel. For example, the aligner can compare a value corresponding to a wheel's initial position 302 to a value corresponding to the wheel's final position 304 to computer a linear difference thereof that corresponds to the value of the distance traveled 316. Similarly, the aligner can compare a value corresponding to a wheel's initial position 302 to a value corresponding to the wheel's final position 304 to computer an angular difference thereof that corresponds to the value of the angle of rotation 320.

The aligner can also take alignment measurements during an alignment and modify one or more of the alignment measurements based on the value of the roll radius 206. Further, the aligner can make comparisons between the alignment measurements and predetermined values that may represent ideal alignment values. Similarly, the aligner can make comparisons between the roll radius measurements and predetermined values that may represent ideal roll radius values.

The aligner can also compare alignment or roll radius measurements of two or more wheels and compute the differences thereof. Such differences can also be compared to predetermined criteria. These comparisons may be made between the two front wheels 22L and 22R, and between the two rear wheels 24L and 24R, to show if there are side to side differences in the alignments or roll radius of the wheels. Similarly, the comparisons may be made front to back, such as between wheels 22L and 22R and also between wheels 24L and 24R.

Further, individual roll radius measurements may be compared to a predetermined value, a predetermined range of values, or manufacturing specifications and the aligner can highlight any that fall outside those specified tolerances, such as by generating an exception that may also include a warning message to alert the alignment technician. A wide variety of potential comparisons of the roll radius measurements may be made in addition to those listed herein. As a result of observing the results on display unit 34, the alignment technician is better able to determine if there is a problem significant enough to cause excessive or uneven wear of the tires or degraded performance of the vehicle, such as decreased handling or stability.

Figure 5:
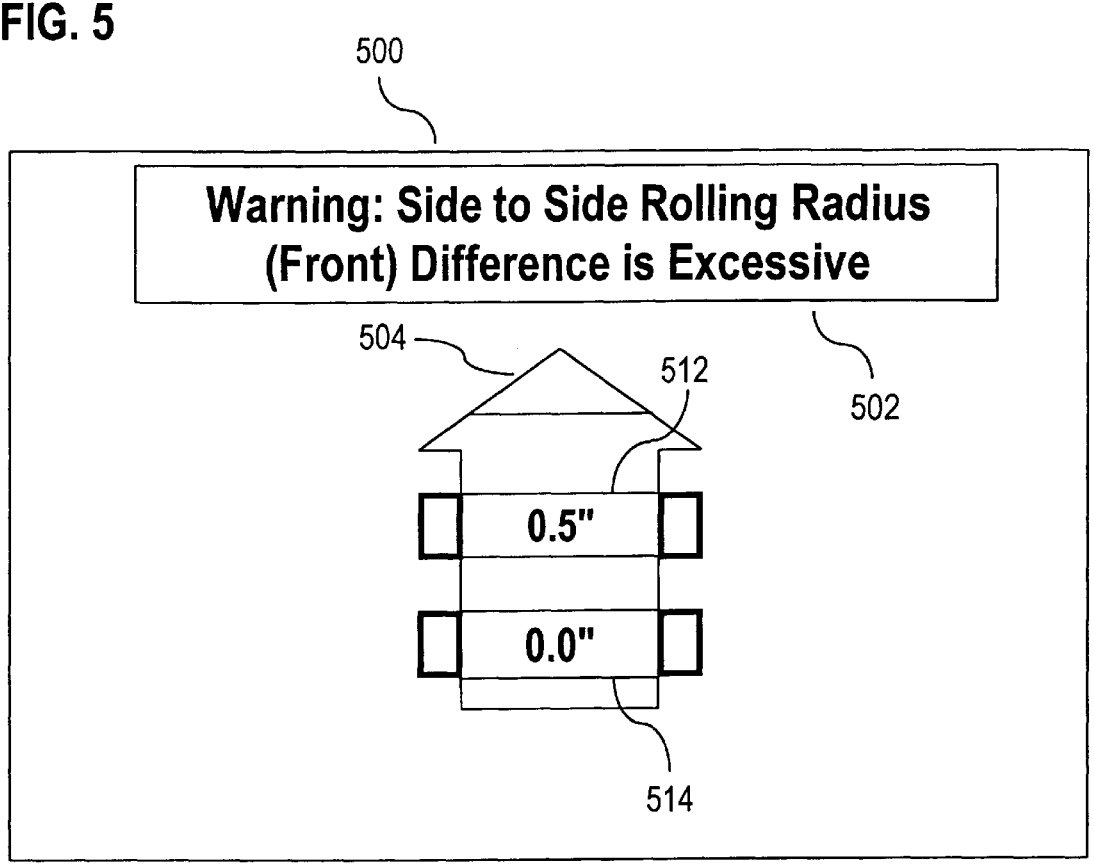
FIG. 5 is a diagram of an exemplary display of the results of comparing roll radius measurements for wheels on each side of a vehicle.

FIG. 5 is diagram of an exemplary display 500 that may be shown on display unit 34, which shows the results of comparing wheels 22L, 22R, 24L, and 24R on the two sides of vehicle 20 for each axle. In this example, a warning message 502 indicates that the comparisons are made from side to side for front wheels 22L and 22R, and also for rear wheels 24L and 24R. Display 500 uses the sample roll radius results shown in FIG. 4.

The aligner causes display unit 34 to indicate that the roll radius difference for the front pair of wheels, 22L and 22R, is excessive using warning message 502. Such an indication serves as a prompt for the alignment technician to investigate the cause of the excessive difference in the roll radius of front wheels, 22L and 22R. For example, the difference may be due to one or more of the following reasons: there is a mismatch of front wheels 22L and 22R (e.g., that they are of different sizes); right front wheel 22R is worn excessively; right front wheel 22R has inadequate air pressure; or that there is unequal suspension loading that should be corrected before continuing with the alignment.

Using the Roll Radius to Calculate the Plane Angle Betweem The Racl Plane and Vehicle Plane The roll radius values may also be used to measure other important parameters, which may in turn be used for comparisons or to modify parameters associated with the alignment of a motor vehicle. In particular, the roll radius value may be used to measure the angle between a reference plane or ground plane (referred to herein as the "rack plane") and a plane passing through the center of the wheels (referred to herein as the "vehicle plane").

The measurement of the angle between the rack plane and vehicle plane (referred to herein as the "plane angle") may be used in a number of ways. For example, the measured alignments of the wheels may need to be corrected or adjusted in order to compare such measured alignments to the automotive manufacturer alignment specifications. This may be particularly important when the alignment specifications are provided with respect to the rack plane, but the measured alignments are determined with respect to the vehicle plane, and the rack plane and the vehicle plane are not parallel, as is the case with the aligner shown in FIG. 1. Alternatively, the manufacturer specifications may be adjusted.

Figure 6A:
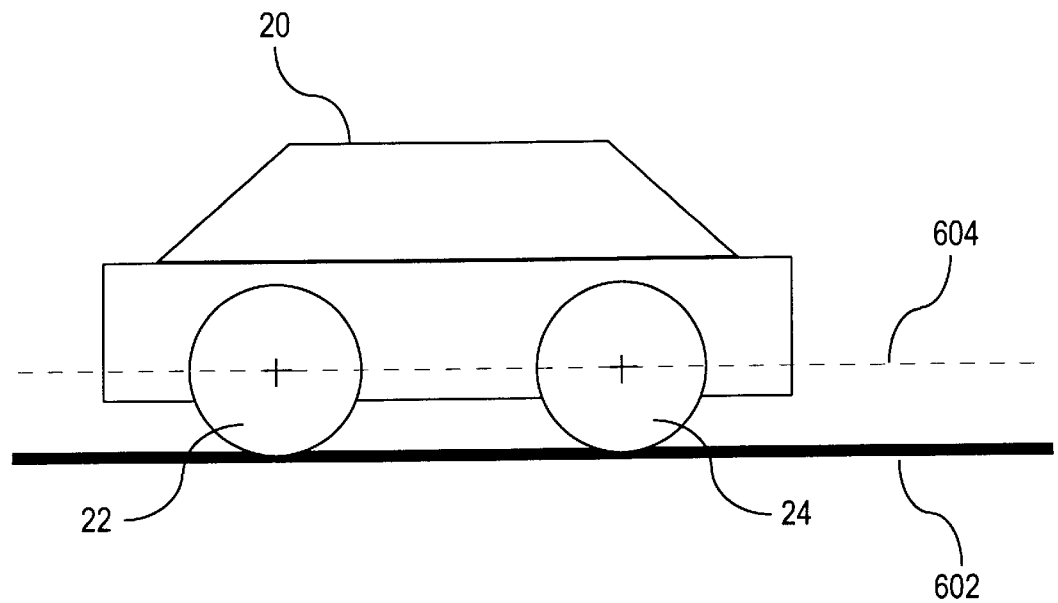
FIG. 6A is a diagram of a vehicle with equally sized wheels illustrating that the rack plane and vehicle plane are parallel.

FIG. 6A is a diagram of vehicle 20 having front wheels 22 and rear wheels 24 of equal size. In this example, a rack plane 602 and a vehicle plane 604 are parallel to each other. Therefore, the plane angle is zero degrees. If the plane angle is zero degrees, then the alignment measurements may be compared directly to the automotive manufacturer alignment specifications.

Figure 6B:
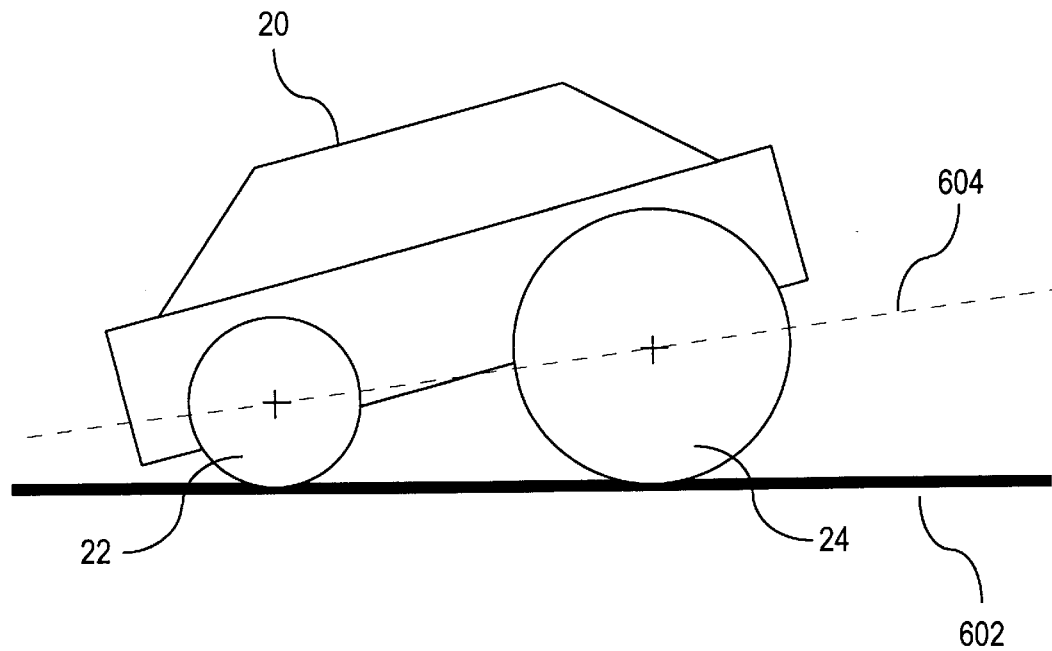
FIG. 6B is a diagram of a vehicle with differently sized wheels illustrating that the rack plane and vehicle plane are not parallel.

However, the wheels of a vehicle often are not exactly the same size. FIG. 6B shows vehicle 20 having front wheels 22 that are smaller than those of rear wheels 24. Note that in FIG. 6B, the difference in size between front wheels 22 and rear wheels 24 are exaggerated for purposes of this explanation. In this example, rack plane 602 and vehicle plane 604 are not parallel, resulting in a nonzero plane angle. As a result, the measured alignments from a system such as that of FIG. 1 need to be adjusted to compare them to the automotive manufacturer alignment specifications, which are typically made with reference to the rack plane. Alternatively, the automotive manufacturer alignment specifications may be adjusted. While FIG. 6B shows a difference between front wheels 22 and rear wheels 24, the wheel sizes may also differ from side to side, for which this same discussion would apply.

Figure 7:
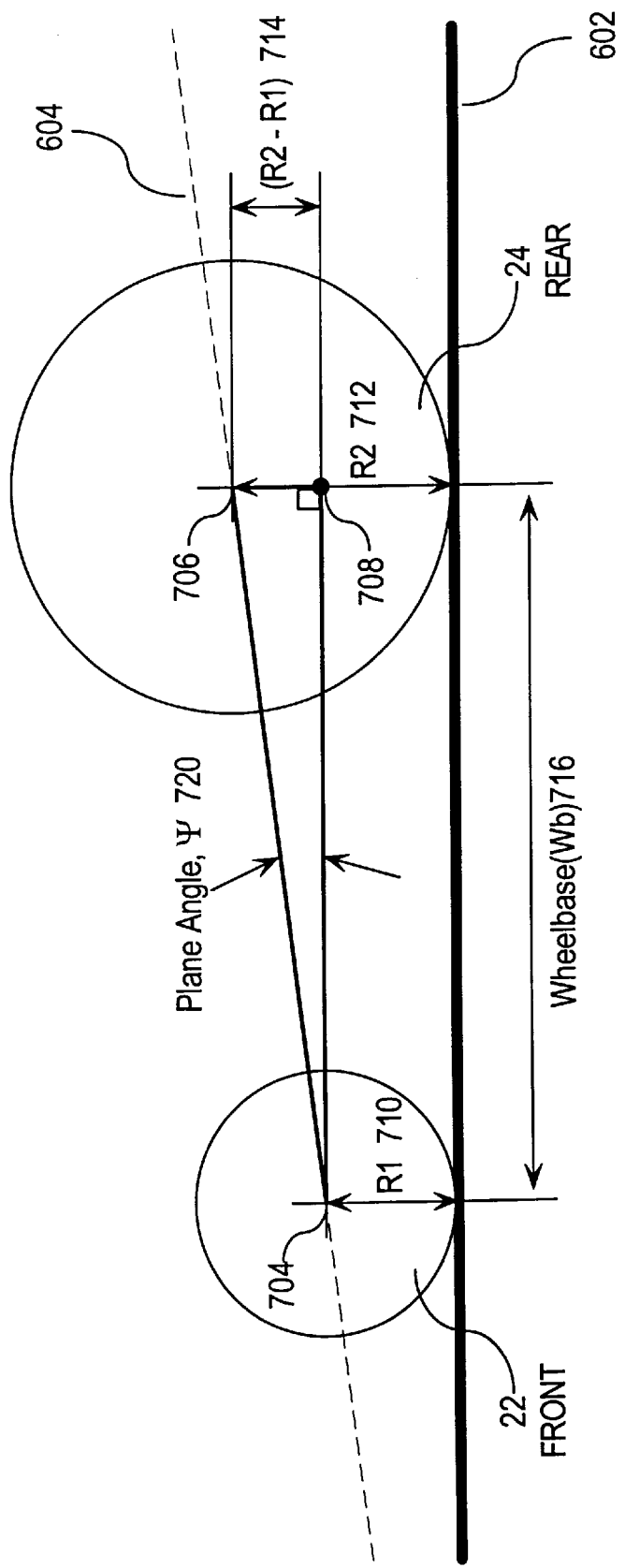
FIG. 7 is a diagram illustrating the information used to measure the angle between the rack plane and the vehicle plane.

The determination of the plane angle between rack plane 602 and vehicle plane 604 is based on the geometric relationship of the inverse tangent. As shown in FIG. 7, a right triangle may be drawn between a front center 704 of front wheel 22, a rear center 706 of rear wheel 24, and a point 708 that is directly below center 504 of rear wheel 24. As shown in FIG. 7, a horizontal displacement between front center 704 of front wheel 22 and rear center 706 of rear wheel 24 is equal to $W_b$, wheelbase of the vehicle.

FIG. 7 also shows that front wheel 22 has a front roll radius 710, denoted R1, and that rear wheel 24 has a rear roll radius 712, denoted R2. A vertical displacement 714 between rear center 706 of rear wheel 24 and point 708 is equal to $R_2$ R1, i.e., the difference between $R_2$, the rear roll radius 712 of the rear wheel 24 and $R_1$, the front roll radius 710 of front heel 22.

Given the vertical displacement 714 and the wheelbase 716, a plane angle 720, denoted $\Psi$, may be determined based on the inverse tangent function according to the following relationship:

$$\psi = \operatorname{Tan}^{-1}\left(\frac{R_2 - R_1}{W_b}\right) \qquad (5)$$

This calculation for plane angle 720 that results from unequal wheel sizes between the front and rear wheels is equally applicable to calculating plane angle 720 resulting from a side to side difference in the size of the wheels.

Once plane angle 720 is determined, it may be used to display the measured alignment values after being adjusted so that they are referenced to the rack plane. A caster value is added to the plane angle difference to yield the rack plane.

Alternative Embodiments Measurement of the Distance Traveled

Figure 8:
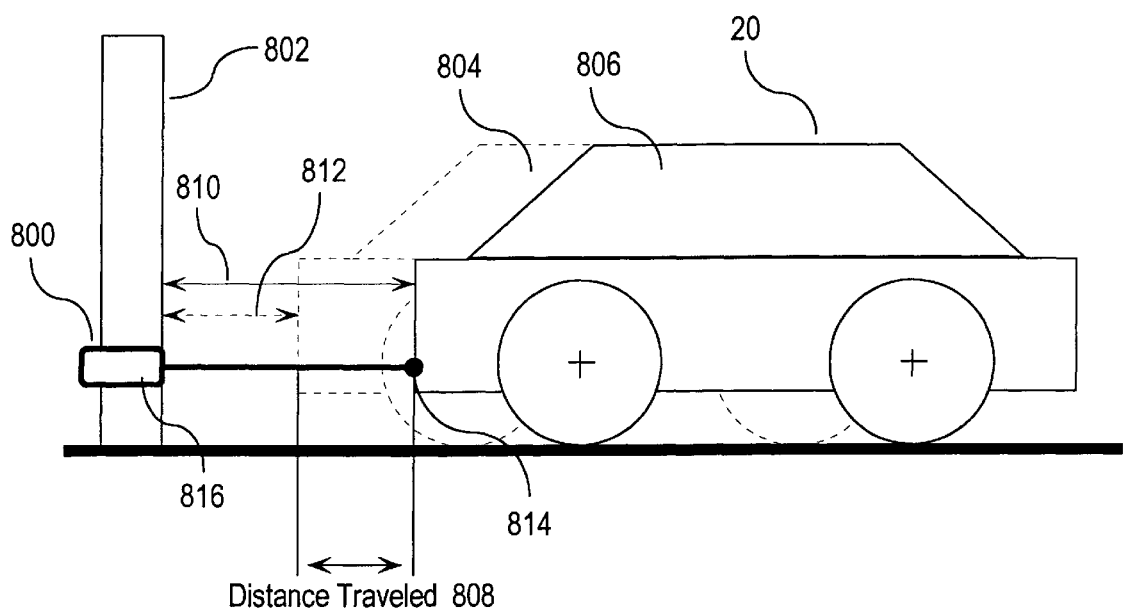
FIG. 8 illustrates the use of a linear transducer to measure the distanced traveled.

In an alternative embodiment, the distance traveled when moving the vehicle may be measured without reference to angles. FIG. 8 shows an example of this alternative embodiment in which vehicle 20 is rolled away from wall 802 from an initial position 804 to a final position 806. In FIG. 8, there is a linear transducer 800 having an element 814 that is attached to a fixed point on the vehicle and having a body 816 secured to a stationary point on the alignment rack, the floor, or a wall 802. The distance traveled 808 is determined by the change in indications of the linear transducer as element 814 moves from an initial position 810 to a final position 812.

In another alternative embodiment, the distance traveled 808 may be measured manually by the alignment technician using a laser range finder, a measurement tape or the equivalent. The resulting measurement of the distance traveled is then input to an alignment system, such as the aligner described above. Such an aligner can also perform other functions, such as measuring the angle of rotation, performing calculations, comparing such results and displaying the results for the alignment technician to evaluate.

Measurement of the Angle of Rotation

In an alternative embodiment, the angle of rotation may be measured electrically by mounting a gravity gauge to a wheel, such that the gravity gauge is parallel to the wheel plane. The wheel plane is an imaginary plane that is generally oriented vertically and parallel to the treads on the tire of the wheel. Therefore, a gravity gauge mounted parallel to the wheel plane is rotated through the same angle of rotation as the wheel itself when the wheel is rolled. If an angular measurement from the gravity gauge is taken at the initial position of the wheel and also at the final position of the wheel, the difference between those two angular measurements yields the angle of rotation.

Figure 9A:
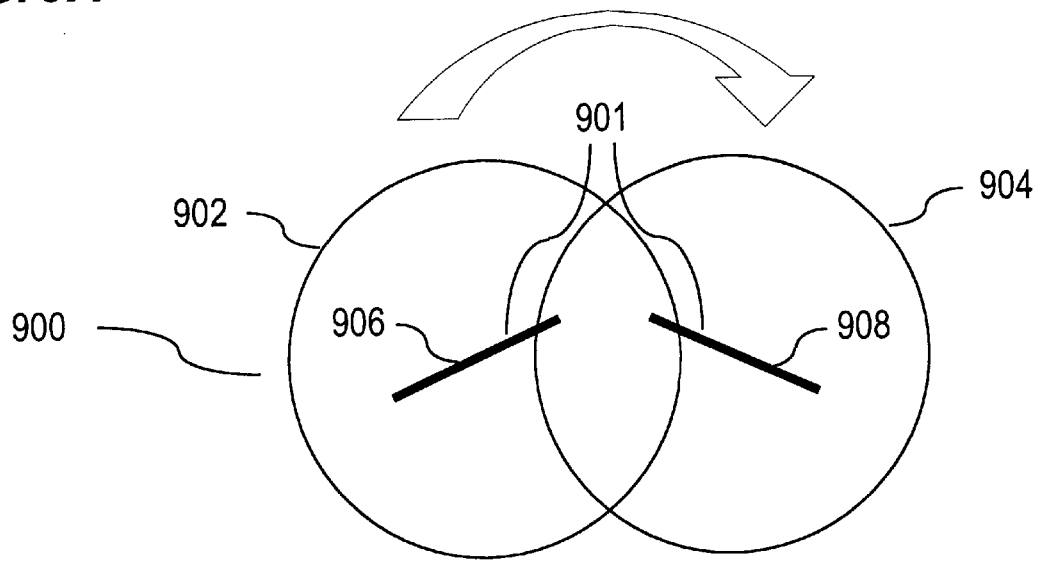
FIG. 9A illustrates the use of a gravity gauge to measure the angle of rotation.
Figure 9B:
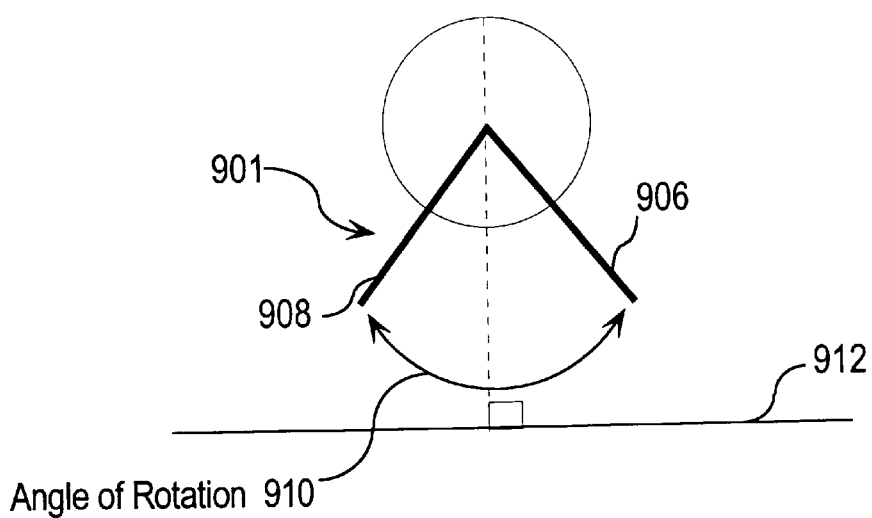
FIG. 9B schematically illustrates a gravity gauge.

FIG. 9A shows an illustration of this alternative embodiment. A wheel 900 has an initial position 902. A gravity gauge 901 is also shown in an initial position 906. When wheel 900 is rolled into a final position 904, gravity gauge 901 is in a final position 908. FIG. 9B is a simplified diagram of gravity gauge 901 in initial position 906 and final position 908. As shown, the angle of rotation 910 is the difference between initial position 906 and final position 908 of gravity gauge 901. At rest, gauge 901 is normal to plane 912.

Gravity gauges that may be used in this alternative embodiment include those in electronic alignment heads made by Hunter Engineering Company or FMC. Typically, there are three gravity gauges in such alignment heads. A first gravity gauge in the wheel plane is called the caster gauge. A second gravity gauge is used to measure the amount that a wheel has turned to determine the run-out compensation of the wheel. Since both gauges are parallel to the plane of the wheel, they are both suitable for use in this alternative embodiment.

In another alternative embodiment, the angle of rotation may be measured manually by the alignment technician. The resulting measurement of the angle of rotation may then be input to an alignment system, such as the aligner discussed above. The aligner may also perform other required measurements, such as that of the distance traveled, and further perform calculations and/or comparisons of the results and display the results of such measurements, calculations, and comparisons.

Measurement of the Roll Radius

In many alignment systems, heads or targets are attached to the wheels with clamps that are self-centering. Thus, a point on the head and clamp assembly is known to be at the center of the wheel. By measuring the distance between this center point and any point on the outer edge of the wheel, the radius of the wheel to that point on the outer edge of the wheel may be determined. If such a measurement is made to the point at the bottom of the wheel in contact with the surface upon which the wheel sits, and which is located directly beneath the center of the wheel, then the roll radius of the wheel may be measured directly.

In an alternative embodiment, a ride height measurement device may be used to measure the roll radius. A ride height measurement device is conventionally used for measuring the distance between the center of the wheel and the top of the wheel well for ride height measurements. For example, a ride height measurement device manufactured by Hunter Engineering Company may be modified mechanically to enable the device to touch the top of the wheel or to touch the test bed or alignment rack upon which the vehicle sits. The modifications could include mounting the L bar upside down and adding a longer horizontal section to enable it to touch the top of the wheel. The apparatus can be mounted upside down so that its linear measurement device moves to touch the surface that the vehicle is sitting on. This provides the alignment system with a direct measurement of the roll radius of the particular wheel.

In another alternative embodiment, the roll radius may be measured manually by the alignment technician using a measurement tape or the equivalent to determine the distance between the center of the wheel and the point on the outer edge of the wheel directly beneath the center of the wheel. This roll radius measurement may then be input to an alignment system, such as the aligner discussed above. The aligner may perform other required measurements, and further perform calculations and/or comparisons of the results and display the results of such measurements, calculations, and comparisons.

Hareware Overview

Figure 10:
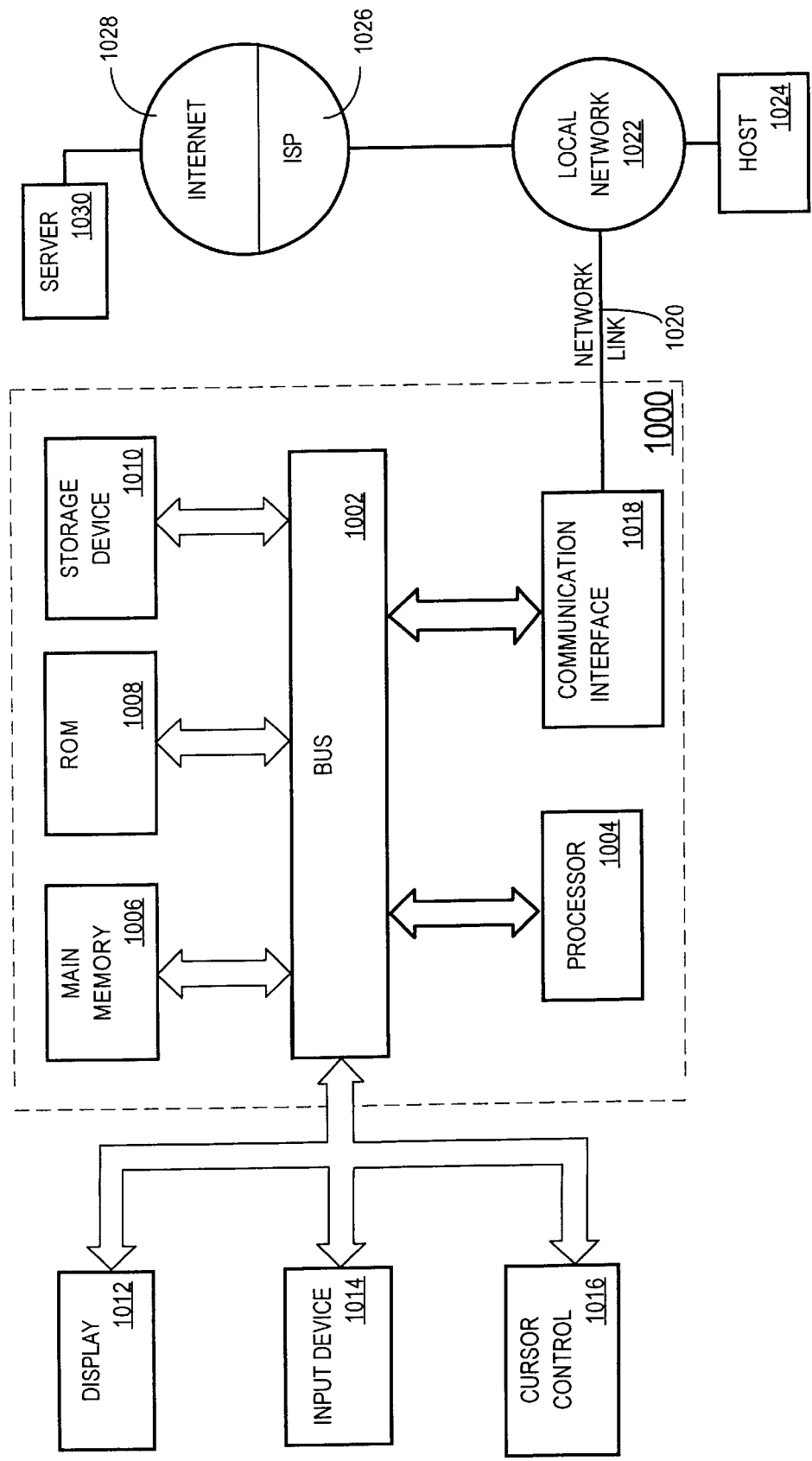
FIG. 10 is a block diagram of a computer system upon which an embodiment may be implemented.

FIG. 10 is a block diagram that illustrates a computer system 1000 upon which an embodiment of the invention may be implemented. Computer system 1000 includes a bus 1002 or other communication mechanism for communicating information, and a processor 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

The invention is related to the use of computer system 1000 for determining the roll radius of each of the wheels of a motor vehicle and also the plane angle between the rack plane and the vehicle plane. According to one embodiment of the invention, the roll radius and plane angle are provided by computer system 1000 in response to processor 1004 executing one or more sequences of one or more instructions contained in main memory 1006. Such instructions may be read into main memory 1006 from another computer-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1004 for execution. Such a medium may take many forms, including but not limited to, non-volatile media, volatile media, and transmission media. Non-volatile media includes, for example, optical or magnetic disks, such as storage device 1010. Volatile media includes dynamic memory, such as main memory 1006. Transmission media includes coaxial cables, copper wire and fiber optics, including the wires that comprise bus 1002. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. In accordance with the invention, one such downloaded application provides for determining the roll radius of the wheels of a motor vehicle and determining the plane angle as described herein.

The received code may be executed by processor 1004 as it is received, and/or stored in storage device 1010, or other non-volatile storage for later execution. In this manner, computer system 1000 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of measuring a roll radius value (R) of a wheel having an optically scannable target attached thereto, comprising the computer-implemented steps of:

optically scanning the target when the wheel is in an initial position and creating and storing values representing the initial position;

rolling the wheel from the initial position to a final position;

optically scanning the target at the final position and creating and storing values representing the final position;

measuring a distance traveled value (P) during the rolling of the wheel based on the position values;

measuring an angle of rotation value($\vartheta$) traversed during the rolling of the wheel based on the position values;

creating and storing the roll radius value of the wheel according to the relationship $$R = \frac{360(P)}{2\pi\vartheta}.$$

2. The method as recited in claim 1, wherein measuring a distance traveled value comprises the steps of comparing the initial position value to the final position value and computing a linear difference thereof.

3. The method as recited in claim 1, wherein measuring a distance traveled value comprises the steps of comparing the initial position value to the final position value using a machine vision system and computing a linear difference thereof.

4. A method as recited in claim 1, wherein measuring an angle of rotation value comprises the steps of comparing the initial position value to the final position value and computing an angular difference thereof.

5. A method as recited in claim 1, wherein measuring an angle of rotation value comprises the steps of comparing the initial position value to the final position value using a machine vision system and computing an angular difference thereof.

6. A method as recited in claim 1, wherein the step of creating the roll radius value (R) of the wheel comprises computing the relationship $$R = \frac{360(P)}{2\pi\vartheta}$$

using a data processor of a machine vision system.

7. A method as recited in claim 1, further comprising the steps of:

creating and storing one or more wheel alignment values during alignment of a motor vehicle using an aligner; and modifying one or more of the wheel alignment values based on the roll radius value.

8. A method as recited in claim 1, further comprising the steps of:

comparing the roll radius value to a predetermined range of values; and generating an exception if the roll radius value falls outside the predetermined range of values.

9. A method as recited in claim 1, further comprising the step of:

comparing the roll radius value to a pre-determined second roll radius value representing ideal roll radius value.

10. A method as recited in claim 1, further comprising the steps of:

rolling a second wheel;

measuring a second distance traveled value ($P_2$) during the rolling of the second wheel;

measuring a second angle of rotation value($\vartheta_2$) traversed during the rolling of the second wheel;

determining a second roll radius value ($R_2$) of the second wheel according to the relationship $$R_2 = \frac{360(P_2)}{2\pi\vartheta_2};$$

comparing the roll radius value to the second roll radius value; and creating and storing a mismatch value that represents an amount of mismatch among the wheel and the second wheel.

11. A method as recited in claim 1, further comprising the steps of:

measuring a plane angle value ($\Psi$) between a rack plane and a vehicle plane of a motor vehicle resting on an alignment rack by performing the steps of measuring a first roll radius value ($R_1$) of a first wheel of the motor vehicle and a second roll radius value ($R_2$) of a second wheel of the motor vehicle, measuring a horizontal displacement value ($W_b$) between a first center of the first wheel and a second center of the second wheel, and determining and storing the plane angle value according to the relationship $$\psi = \text{Tan}^{-1}\left(\frac{R_2 - R_1}{W_b}\right)$$

12. A method as recited in claim 1, further comprising the steps of:

measuring a plane angle value ($\Psi$) between a rack plane and a vehicle plane of a motor vehicle resting on an alignment rack by performing the steps of measuring a first roll radius value ($R_1$) of a first wheel of the motor vehicle and a second roll radius value ($R_2$) of a second wheel of the motor vehicle, measuring a horizontal displacement value ($W_b$) between a first center of the first wheel and a second center of the second wheel, and determining the plane angle value according to the relationship $$\psi = \text{Tan}^{-1}\left(\frac{R_2 - R_1}{W_b}\right); \text{and}$$

modifying one or more values associated with an alignment of the motor vehicle based on the plane angle value.

13. A method as recited in claim 1, wherein determining the roll radius value comprises the steps of:

determining a center of the wheel;

identifying a contact point between the wheel and a surface upon which the wheel sits, the contact point being located directly underneath the center of the wheel; and measuring a vertical distance value between the center and the contact point that corresponds to the roll radius value of the wheel.

14. A method for measuring a plane angle value (Ψ) between a rack plane and a vehicle plane of a motor vehicle resting on an alignment rack, comprising the steps of:
   measuring a first roll radius value ($R_1$) of a first wheel of the motor vehicle and a second roll radius value ($R_2$) of a second wheel of the motor vehicle;
   measuring a horizontal displacement value ($W_b$) between a first center of the first wheel and a second center of the second wheel;
   determining the plane angle value according to the relationship $$\psi = \text{Tan}^{-1}\left(\frac{R_2 - R_1}{W_b}\right); \text{ and}$$

modifying one or more values associated with an alignment of the motor vehicle based on the plane angle value.

15. A method as recited in claim 14, further comprising the steps of:
   adjusting a plurality of wheel alignment values to account for the plane angle value; and
   generating information that may be used to display the adjusted wheel alignment values to an alignment technician.

16. A computer-readable medium carrying one or more sequences of instructions which, when executed by one or more processors, cause the one or more processors to measure a roll radius value (R) of a wheel having an optically scannable target attached thereto by performing the steps of:
   optically scanning the target when the wheel is in an initial position and creating and storing values representing the initial position;
   rolling the wheel from the initial position to a final position;
   optically scanning the target at the final position and creating and storing values representing the final position;
   measuring a distance traveled value (P) during the rolling of the wheel based on the position values;
   measuring an angle of rotation value(ϑ) traversed during the rolling of the wheel based on the position values;
   creating and storing the roll radius value of the wheel according to the relationship $$R = \frac{360(P)}{2\pi\vartheta}.$$

17. A computer-readable medium as recited in claim 16, wherein measuring a distance traveled value comprises instructions for carrying out the steps of comparing the initial position value to the final position value and computing a linear difference thereof.

18. A computer-readable medium as recited in claim 16, wherein measuring a distance traveled value comprises instructions for carrying out the steps of comparing the initial position value to the final position value using a machine vision system and computing a linear difference thereof.

19. A computer-readable medium as recited in claim 16, wherein measuring an angle of rotation value comprises instructions for carrying out the steps of comparing the initial position value to the final position value and computing an angular difference thereof.

20. A computer-readable medium as recited in claim 16, wherein measuring an angle of rotation value comprises instructions for carrying out the steps of comparing the initial position value to the final position value using a machine vision system and computing an angular difference thereof.

21. A computer-readable medium as recited in claim 16, wherein the step of creating the roll radius value (R) of the wheel comprises instructions for computing the relationship $$R = \frac{360(P)}{2\pi\vartheta}$$

using a data processor of a machine vision system.

22. A computer-readable medium as recited in claim 16, further comprising instructions for carrying out the steps of:
   creating and storing one or more wheel alignment values during alignment of a motor vehicle using an aligner; and
   modifying one or more of the wheel alignment values based on the roll radius value.

23. A computer-readable medium as recited in claim 16, further comprising instructions for carrying out the steps of:
   comparing the roll radius value to a predetermined range of values; and
   generating an exception if the roll radius value falls outside the predetermined range of values.

24. A computer-readable medium as recited in claim 16, further comprising instructions for carrying out the step of:
   comparing the roll radius value to a predetermined second roll radius value representing a an ideal roll radius value.

25. A computer-readable medium as recited in claim 16, further comprising instructions for carrying out the steps of:
   rolling a second wheel;
   measuring a second distance traveled value ($P_2$) during the rolling of the second wheel;
   measuring a second angle of rotation value($\vartheta_2$) traversed during the rolling of the second wheel;
   determining a second roll radius value ($R_2$) of the second wheel according to the relationship $$R_2 = \frac{360(P_2)}{2\pi\vartheta_2};$$

comparing the roll radius value to the second roll radius value; and
   creating and storing a mismatch value that represents an amount of mismatch among the wheel and the second wheel.

26. A computer-readable medium as recited in claim 16, further comprising instructions for carrying out the steps of:
   measuring a plane angle value (Ψ) between a rack plane and a vehicle plane of a motor vehicle resting on an alignment rack by performing the steps of
   measuring a first roll radius value ($R_1$) of a first wheel of the motor vehicle and a second roll radius value ($R_2$) of a second wheel of the motor vehicle,
   measuring a horizontal displacement value ($W_b$) between a first center of the first wheel and a second center of the second wheel, and
   determining and storing the plane angle value according to the relationship $$\psi = \text{Tan}^{-1}\left(\frac{R_2 - R_1}{W_b}\right).$$

27. A computer-readable medium as recited in claim 16, further comprising instructions for carrying out the steps of:
    measuring a plane angle value (Ψ) between a rack plane and a vehicle plane of a motor vehicle resting on an alignment rack by performing the steps of
    measuring a first roll radius value ($R_1$) of a first wheel of the motor vehicle and a second roll radius value ($R_2$) of a second wheel of the motor vehicle,
    measuring a horizontal displacement value ($W_b$) between a first center of the first wheel and a second center of the second wheel, and
    determining the plane angle value according to the relationship $$\psi = \text{Tan}^{-1}\left(\frac{R_2 - R_1}{W_b}\right); \text{ and}$$

modifying one or more values associated with an alignment of the motor vehicle based on the plane angle value.

28. A computer-readable medium as recited in claim 16, further comprising instructions for carrying out the steps of:
    determining a center of the wheel;
    identifying a contact point between the wheel and a surface upon which the wheel sits, the contact point being located directly underneath the center of the wheel; and
    measuring a vertical distance value between the center and the contact point;
    whereby the vertical distance value corresponds to the roll radius value of the wheel.

29. A computer-readable medium carrying one or more sequences of instructions which, when executed by one or more processors, cause the one or more processors to measure a plane angle value (Ψ) between a rack plane and a vehicle plane of a motor vehicle resting on an alignment rack by performing the steps of:
    measuring a first roll radius value ($R_1$) of a first wheel of the motor vehicle and a second roll radius value ($R_2$) of a second wheel of the motor vehicle;
    measuring a horizontal displacement value ($W_b$) between a first center of the first wheel and a second center of the second wheel;
    determining the plane angle value (Ψ) according to the relationship $$\psi = \text{Tan}^{-1}\left(\frac{R_2 - R_1}{W_b}\right); \text{ and}$$

modifying one or more values associated with an alignment of the motor vehicle based on the plane angle value.

30. A computer-readable medium as recited in claim 29, further comprising instructions for carrying out the steps of:
    adjusting a plurality of wheel alignment values to account for the plane angle value; and
    displaying the adjusted wheel alignment values to an alignment technician.

31. An apparatus for measuring a roll radius value of a wheel that is rolled from an initial position to a final position, the wheel having a target fixedly attached, comprising:
    a vision imaging apparatus that detects an initial image of the target when the wheel is in the initial position and that detects a final image of the target when the wheel is in the final position; and
    a data processor that is programmed to measure the roll radius value during the rolling of the wheel based upon a comparison of the initial image and the final image of the target.

32. An apparatus as recited in claim 31, wherein the vision imaging apparatus detects the initial image of the target by optically scanning the target when the wheel is in the initial position and detects the final image of the target by optically scanning the target when the wheel is in the final position.

33. An apparatus as recited in claim 31, wherein the data processor is programmed to (a) measure a distance traveled value (P) during the rolling of the wheel based on the initial and final images, (b) measure an angle of rotation value (ϑ) traversed by the rolling of the wheel based on the initial and final images, and (c) determine the roll radius value (R) of the wheel according to the relationship $$R = \frac{360(P)}{2\pi\vartheta}.$$

34. An apparatus as recited in claim 31, wherein the data processor is programmed to (a) create and store an initial position value that corresponds to the initial image and a final position value that corresponds to the final image, (b) compare the initial position value to the final position value, (c) compute a linear difference thereof that corresponds to the distance traveled value (P), (d) measure an angle of rotation value (ϑ) traversed by the rolling of the wheel based on the initial and final images, and (e) determine the roll radius value (R) of the wheel according to the relationship $$R = \frac{360(P)}{2\pi\vartheta}.$$

35. An apparatus as recited in claim 31, wherein the data processor is programmed to (a) measure a distance traveled value (P) during the rolling of the wheel based on the initial and final images, (b) create and store an initial position value that corresponds to the initial image and a final position value that corresponds to the final image, (c) compare the initial position value to the final position value, (d) compute an angular difference thereof that corresponds to the angle of rotation value (ϑ), and (e) determine the roll radius value (R) of the wheel according to the relationship $$R = \frac{360(P)}{2\pi\vartheta}.$$

36. An apparatus as recited in claim 31, wherein the data processor is programmed to (a) create and store one or more wheel alignment values during alignment of a motor vehicle using an aligner and (b) modify one or more of the wheel alignment values based on the roll radius value.

37. An apparatus as recited in claim 31, wherein the data processor is programmed to (a) compare the roll radius value to a predetermined range of values and (b) generate an exception if the roll radius value falls outside the predetermined range of values.

38. An apparatus as recited in claim 31, wherein the data processor is programmed to compare the roll radius value to a predetermined second roll radius value representing ideal roll radius value.

39. An apparatus as recited in claim 31, wherein the data processor is programmed to (a) measure a second roll radius value as a result of rolling a second wheel, measure a second distance traveled value (P$_2$), measure a second angle of rotation value($\vartheta_2$), and determine a second roll radius value (R$_2$) according to the relationship $$R_2 = \frac{360(P_2)}{2\pi\vartheta_2},$$

(b) compare the roll radius value to the second roll radius value, and (c) create and store a mismatch value that represents an amount of mismatch among the wheel and the second wheel.

40. An apparatus as recited in claim 31, wherein the data processor is programmed to (a) measure a first roll radius value (R$_1$) of a first wheel of a motor vehicle and a second roll radius value (R$_2$) of a second wheel of the motor vehicle, (b) measure a horizontal displacement value (W$_b$) between a first center of the first wheel and a second center of the second wheel, (c) determine and store a plane angle value ($\Psi$) between a rack plane and a vehicle plane of the motor vehicle resting on an alignment rack according to the relationship $$\psi = \mathrm{Tan}^{-1}\left(\frac{R_2 - R_1}{W_b}\right).$$

41. An apparatus as recited in claim 31, wherein the data processor is programmed to (a) measure a first roll radius value (R$_1$) of a first wheel of a motor vehicle and a second roll radius value (R$_2$) of a second wheel of the motor vehicle, (b) measure a horizontal displacement value (W$_b$) between a first center of the first wheel and a second center of the second wheel, (c) determine a plane angle value ($\Psi$) between a rack plane and a vehicle plane of the motor vehicle resting on an alignment rack according to the relationship $$\psi = \mathrm{Tan}^{-1}\left(\frac{R_2 - R_1}{W_b}\right), \text{ and}$$

(d) modify one or more values associated with an alignment of the motor vehicle based on the plane angle value.

42. An apparatus as recited in claim 31, wherein the data processor is programmed to (a) determine a center of the wheel, (b) identify a contact point between the wheel and a surface upon which the wheel sits, the contact point being directly underneath the center, and (c) measure a vertical distance value between the center and the contact point, whereby the vertical distance value corresponds to the roll radius value of the wheel.

43. An apparatus for measuring a plane angle value ($\Psi$) between a rack plane and a vehicle plane of a motor vehicle resting on an alignment rack, the motor vehicle having two or more wheels, each wheel having a target fixedly attached, comprising:

a vision imaging apparatus that detects a first image of a first target fixedly attached to a first wheel and a second image of a second target fixedly attached to a second wheel; and a data processor that is programmed to (a) determine a first roll radius value (R$_1$) of the first wheel and a second roll radius value (R$_2$) of the second wheel, (b) measure a horizontal displacement value (W$_b$) between a first center of the first wheel and a second center of the second wheel based upon the first image and the second image, (c) determine the plane angle ($\Psi$) according to the relationship $$\psi = \mathrm{Tan}^{-1}\left(\frac{R_2 - R_1}{W_b}\right); \text{ and}$$

(d) modify one or more values associated with an alignment of the motor vehicle based on the plane angle value.

44. An apparatus as recited in claim 43, wherein the data processor is programmed to adjust a plurality of wheel alignment values to account for the plane angle value and further comprising a display unit, wherein the display unit displays the adjusted wheel alignment values to an alignment technician.

45. A method of measuring a roll radius value of a wheel, comprising the computer-implemented steps of:

creating and storing values representing an initial position of the wheel;

rolling the wheel from the initial position to a final position;

creating and storing values representing the final position of the wheel;

measuring a distance traveled value (P) during the rolling of the wheel by comparing the initial position values and the final position values;

measuring an angle of rotation value($\vartheta$) traversed during the rolling of the wheel by comparing the initial position values and the final position values;

creating and storing the roll radius value (R) of the wheel according to the relationship $$R = \frac{360(P)}{2\pi\vartheta}.$$

* * * * *